United States Patent
Zimmer et al.

(10) Patent No.: US 7,734,934 B2
(45) Date of Patent: Jun. 8, 2010

(54) SEAMLESS DATA MIGRATION

(75) Inventors: Vincent J. Zimmer, Federal Way, WA (US); Michael A. Rothman, Puyallup, WA (US)

(73) Assignee: Intel Corporation, Santa Clara, CA (US)

( * ) Notice: Subject to any disclaimer, the term of this patent is extended or adjusted under 35 U.S.C. 154(b) by 1204 days.

(21) Appl. No.: 11/313,307

(22) Filed: Dec. 20, 2005

(65) Prior Publication Data
US 2010/0088499 A1 Apr. 8, 2010

(51) Int. Cl.
G06F 11/30 (2006.01)

(52) U.S. Cl. .......................... 713/193; 713/1; 713/150; 713/162; 713/165; 726/26; 380/200

(58) Field of Classification Search .................. 713/193
See application file for complete search history.

(56) References Cited

U.S. PATENT DOCUMENTS

| | | | | |
|---|---|---|---|---|
| 6,697,489 | B1* | 2/2004 | Candelore | 380/200 |
| 7,299,354 | B2* | 11/2007 | Khanna et al. | 713/165 |
| 7,421,588 | B2* | 9/2008 | Challener et al. | 713/193 |
| 2003/0110372 | A1* | 6/2003 | Proudler | 713/150 |
| 2004/0172662 | A1* | 9/2004 | Danker et al. | 725/135 |
| 2005/0010811 | A1* | 1/2005 | Zimmer et al. | 713/201 |
| 2005/0091494 | A1* | 4/2005 | Hyser | 713/171 |
| 2005/0144443 | A1* | 6/2005 | Cromer et al. | 713/165 |
| 2005/0289652 | A1* | 12/2005 | Sharma et al. | 726/26 |
| 2006/0005000 | A1* | 1/2006 | King et al. | 713/1 |
| 2006/0026419 | A1* | 2/2006 | Arndt et al. | 713/150 |
| 2006/0053290 | A1* | 3/2006 | Randle et al. | 713/169 |
| 2006/0075223 | A1* | 4/2006 | Bade et al. | 713/162 |

OTHER PUBLICATIONS

Dierks, T. & C. Allen, "The TLS Protocol Version 1.0", RFC 2246, [online], Jan. 1999, [retrieved on Jul. 22, 2005], retrieved from the Internet at <URL: http://www/faqs.org/rfcs/rfc2246.html>.

Evers, J., "Microsoft's Leaner Approach to Vista Security", [online], Aug. 29, 2005, [retrieved on Sep. 16, 2005], retrieved from the Internet at <URL: http://news.com.com/microsofts+leaner+approach+to+Vista+Security/2100-7355_3-58438...>.

IEEE Computer Society, "IEEE Standard for Information Technology 802.3- Part 3: Carrier Sense Multiple Access with Collision Detection (CSMA/CD) Access Method and Physical Layer Specifications", Mar. 8, 2002, pp. 1-32.

IEEE Computer Society, "Supplement to IEEE Standard for Information Technology 802.11b- Part 11: Wireless LAN Medium Access Control (MAC) and Physical Layer (PHY) Specifications: Higher-Speed Physical Layer Extension in the 2.4 GHz Band", Jan. 20, 2000, pp. iii-vi & 1-10.

(Continued)

*Primary Examiner*—Kambiz Zand
*Assistant Examiner*—Yonas Bayou
(74) *Attorney, Agent, or Firm*—Konrad Raynes & Victor LLP; Janaki K. Davda (57) ABSTRACT

Provided are techniques for migrating data. Contents are sealed to one or more registers. In response to determining that secure backup is enabled, platform metrics are stored in a private store. An out-of-band request is received. A response to the out-of-band request is provided using the stored platform metrics.

Other embodiments are described and claimed.

16 Claims, 7 Drawing Sheets

OTHER PUBLICATIONS

Information Sciences Institute, "Internet Protocol", RFC 791, Sep. 1981, pp. 1-45.

Information Sciences Institute, "Transmission Control Protocol", RFC 793, Sep. 1981, pp. 1-85.

Krueger, M., R. Haagens, C. Sapuntzakis, & M. Bakke, "Small Computer Systems Interface Protocol Over the Internet (iSCSI) Requirements and Design Considerations", RFC 3347, Jul. 2002, pp. 1-26.

Microsoft Corporation, "Secure Startup- Full Volume Encryption: Technical Overview", [online], Apr. 25, 2005, [retrieved on Jul. 20, 2005], retrieved from the Internet at <URL: http://www.microsoft.com/whdc/system/platform/pcdesign/secure-start_tech.mspx>.

Microsoft Corporation, "Secure Startup- Full Volume Encryption: Technical Overview", WinHEC 2005 Version, Apr. 22, 2005, pp. 1-20.

PCI-SIG, "PCI Specifcations", [online], © 2004, retrieved from the Internet at <URL: http://www.pci-sig.com>.

Satran, J., K. Meth, C. Sapuntzakis, M. Chadalapaka, & E. Zeidner, "iSCSI", Jan. 19, 2003, pp. 1-238.

Serial ATA Workgroup, "Serial ATA: High Speed Serialized AT Attachment", Revision 1.0, Aug. 29, 2001, pp. 1-34.

Shanley, T. & D. Anderson, *PCI System Architecture*, Fourth Edition, Addison-Wesley, Boston, 1999, pp. 1-21 (Table of Contents through Ch. 2).

Trusted Computing Group, "About the Trusted Computing Group", © 2005, [retrieved on Dec. 20, 2005], retrieved from the Internet at <URL: http://www.trustedcomputinggroup.org/about>.

Trusted Computing Group, "TCG Specification Architecture Overview", Revision 1.2, Apr. 28, 2004, pp. i-vi & 1-48.

Weber, R., M. Rajagopal, F. Travostino, M. O'Odonnell, C. Monia, & M. Merhar, "Fibre Channel (FC) Frame Encapsulation", RFC 3643, Dec. 2003, pp. 1-20.

Weber, R.O. (Ed.), "Information Technology- SCSI Architecture Model- 2 (SAM-2)", Revision 24, Sep. 12, 2002, pp. 1-102.

\* cited by examiner

SEAMLESS DATA MIGRATION

BACKGROUND

A platform may be described as the underlying hardware and/or software for a computing device. Platforms are rapidly converging toward more use of platform security, such as the use of a Trusted Platform Module (TPM) (http://www.trustedcomputinggroup.org) to encrypt disk content (i.e., data) of a full disk volume. A TPM may be described as a microcontroller that stores a storage root key and that is capable of encrypting and decrypting disk content. The TPM storage root key is a public/private key pair. Any data encrypted with the storage root key public key, may only be decrypted by the corresponding storage root key private key.

An operating system may use TPM to encrypt disk content, and this is referred to as in-band operating system security. For example, the Secure Startup Full-Volume Encryption (FVE) mode available from Microsoft Corporation in the Vista Windows® operating system uses TPM.

The disk volume may be divided into disk partitions. An in-band operating system encryption/decryption agent may encrypt and decrypt content on a disk partition with which the agent is associated. Out-of-band agents may be described as managing requests to and from a remote agent (e.g., at a remote computing device). Out-of-band agents are capable of performing tasks on any of the disk partitions. Out-of-band requests may be described as those that are managed by remote agents which use the capabilities of out-of-band agents. For example, if a user at a local computing device is playing a computer game, and an administrator at a remote computing device wants to know the temperature of the local computing device, a remote agent at the remote computing device may contact an out-of-band agent at the local computing device to determine the temperature. The user's game is not interrupted, and, typically, the user is not aware of the out-of-band request.

An operating system that uses TPM provides encryption that is at odds with an Out-Of-Band (OOB) disk backup strategy. In particular, conventional remote disk backup operations assume that disk content is stored in the clear (i.e., in an unencrypted manner). Thus, because disk content would ordinarily be opaque to agents other than the in-band operating system encryption/decryption agent, these other agents may not be able to read the encrypted disk content. Therefore, certain in-band operating system encryption/decryption technologies may moot some of the management advantages of existing out-of-band agents.

Thus, there is a need in the art for seamless data migration to enable out-of-band operations to be performed.

BRIEF DESCRIPTION OF THE DRAWINGS

Referring now to the drawings in which like reference numbers represent corresponding parts throughout.

DETAILED DESCRIPTION

In the following description, reference is made to the accompanying drawings which form a part hereof and which illustrate several embodiments. It is understood that other embodiments may be utilized and structural and operational changes may be made.

Figure 1:
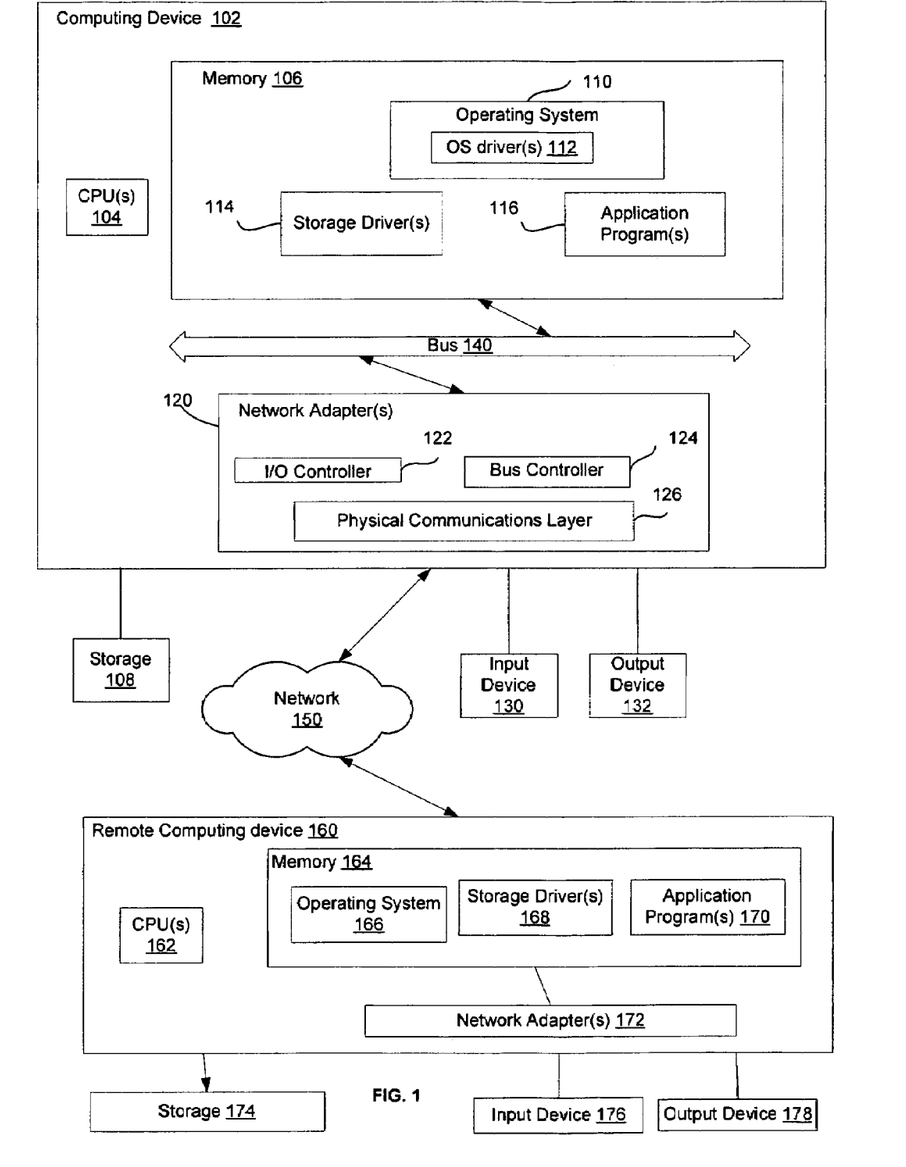
FIG. 1 illustrates a computing environment in accordance with certain embodiments.

FIG. 1 illustrates of a computing environment in which certain embodiments may be implemented. A computing device 102 includes one or more Central Processing Units (CPUs) 104, a volatile memory 106, non-volatile storage 108 (e.g., magnetic disk drives, optical disk drives, a tape drive, etc.), an operating system 110, and one or more network adapters 120. The operating system 110 may include one or more Operating System (OS) drivers 112. One or more storage drivers 114 and one or more application programs 116 are stored in memory 106 for execution by a CPU 104 and are capable of transmitting and retrieving packets from remote computing device 160 over the network 150.

The storage 108 may comprise an internal storage device or an attached or network accessible storage. Programs in the storage 108 may be loaded into the memory 106 and executed by the CPU 104. An input device 130 is used to provide user input to the CPU 104, and may include a keyboard, mouse, pen-stylus, microphone, touch sensitive display screen, or any other activation or input mechanism known in the art. An output device 132 is capable of rendering information transferred from the CPU 104, or other component, such as a display monitor, printer, storage, etc.

Each network adapter 120 includes various components implemented in the hardware of the network adapter 120. Each network adapter 120 is capable of transmitting and receiving packets of data over network 150.

Each storage driver 114 executes in memory 106 and includes network adapter 120 specific commands to communicate with each network adapter 120 and interface between the operating system 110 and each network adapter 120. Each, network adapter 120 or storage driver 114 implements logic to process the packets, such as a transport protocol layer to process the content of messages included in the packets that are wrapped in a transport layer, such as Transmission Control Protocol (TCP) (Internet Engineering Task Force (IETF) Request for Comments (RFC) 793, published September 1981) and/or Internet Protocol (IP) (IETF RFC 791, published September 1981), the Internet Small Computer System Interface (iSCSI) (IETF RFC 3347, published February 2003), Fibre Channel (IETF RFC 3643, published December 2003) or any other transport layer protocol known in the art. The transport protocol layer unpacks the payload from the received TCP/IP packet and transfers the data to a storage driver 114 to return to an application program 116. Further, an application program 116 transmitting data transmits the data to a storage driver 114, which then sends the data to the transport protocol layer to package in a TCP/IP packet before transmitting over the network 150.

A bus controller 124 enables each network adapter 120 to communicate on a computer bus 140, which may comprise any suitable bus interface, such as any type of Peripheral Component Interconnect (PCI) bus (e.g., a PCI bus (PCI Special. Interest Group, PCI Local Bus Specification, Rev 2.3, published March 2002), a PCI-X bus (PCI Special Interest Group, PCI-X 2.0a Protocol Specification, published 2002), or a PCI Express bus (PCI Special Interest Group, PCI Express Base Specification 1.0a, published 2002), published March 2002), Small Computer System Interface (SCSI) (Information Technology—SCSI Architecture Model—2 (SAM-2), dpANS, T10 Project 1157-D, Revision 24, Sep. 12, 2002), Serial ATA ((SATA 1.0a Specification, published Feb. 4, 2003), etc. The network adapter 120 includes a network protocol for implementing a physical communication layer 126 to send and receive network packets to and from remote data storages over a network 150. In certain embodiments, the network adapter 120 may implement the Ethernet protocol (IEEE std. 802.3, published Mar. 8, 2002), Fibre Channel, or any other network communication protocol known in the art.

The network adapter 120 includes an Input/Output (I/O) controller 122. In certain embodiments, the I/O controller 122 may comprise Internet Small Computer System Interface (iSCSI controllers), and it is understood that other types of network controllers, such as an Ethernet Media Access Controller (MAC) or Network Interface Controller (NIC), or cards may be used.

In certain embodiments, in addition to one or more storage drivers 120, the computing device 102 may include other drivers, such as a transport protocol driver (not shown) that performs the functions of the transport protocol layer.

The network adapter 120 may include additional hardware logic to perform additional operations to process received packets from the computer 102 or the network 150. Further, the network adapter 120 may implement a transport layer offload engine (TOE) to implement the transport protocol layer in the network adapter as opposed to the computer storage driver 114 to further reduce computing device processing burdens. Alternatively, the transport layer may be implemented in the storage driver 114.

Various structures and/or buffers (not shown) may reside in memory 106 or may be located in a storage unit separate from the memory 106 in certain embodiments.

The remote computing device 160 includes one or more central processing units (CPUs) 162, a volatile memory 164, non-volatile storage 174 (e.g., magnetic disk drives, optical disk drives, a tape drive, etc.), an operating system 166, and one or more network adapters 172. The operating system 166 may include one or more operating system (OS) drivers (not shown). One or more storage drivers 168 and one or more application programs 170 are stored in memory 164 for execution by a CPU 162 and are capable of transmitting and retrieving packets from computing device 102 over the network 150.

The computing devices 102, 160 may each comprise any computing device known in the art, such as a mainframe, server, personal computer, workstation, laptop, handheld computer, telephony device, network appliance, virtualization device, storage controller, etc. Any CPU 104, 162 and operating system 110, 166 known in the art may be used. Programs and data in memory 106, 164 may be swapped into storage 108, 174, respectively, as part of memory management operations.

The storage 174 may comprise an internal storage device or an attached or network accessible storage. Programs in the storage 174 may be loaded into the memory 164 and executed by the CPU 162. An input device 176 is used to provide user input to the CPU 162, and may include a keyboard, mouse, pen-stylus, microphone, touch sensitive display screen, or any other activation or input mechanism known in the art. An output device 178 is capable of rendering information transferred from the CPU 162, or other component, such as a display monitor, printer, storage, etc.

The network adapter 172 may include components (not shown) similar to network adapter 120. The network adapter 172 may be coupled to memory 164 via a bus (not shown) that is similar to bus 140.

Figure 2:
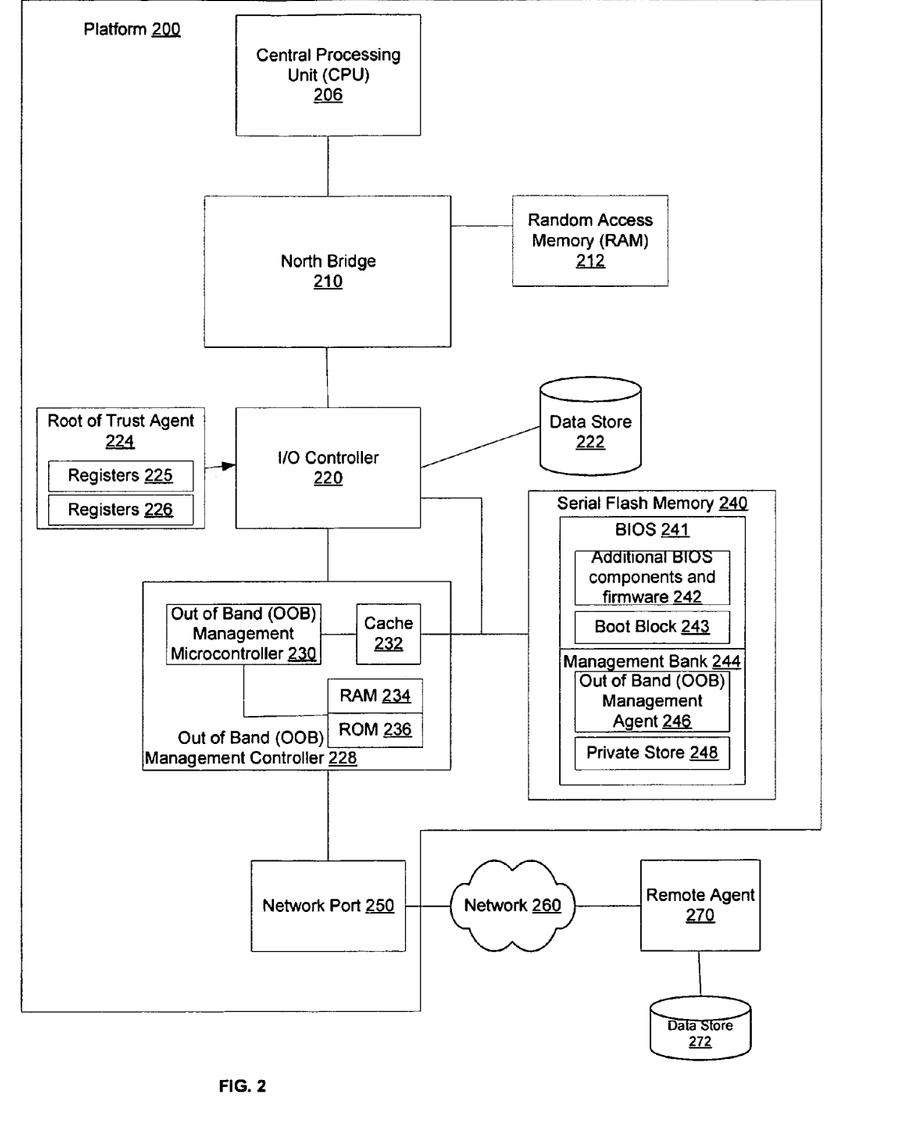
FIG. 2 illustrates a platform of a computer environment in accordance with certain embodiments.

FIG. 2 illustrates a platform 200 of a computer environment in accordance with certain embodiments. The platform 200 may form part of computing device 102. In certain embodiments, the components of FIG. 2 may be implemented in a motherboard. In certain alternative embodiments, the components of FIG. 2 may be implemented as part of an add-on board that may be coupled to the motherboard of a computing device.

In FIG. 2, a Central Processing Unit (CPU) 206 is coupled to a north bridge 210. The north bridge may be described as a component that interacts with the CPU 206 and RAM 212 and is capable of being programmed to process CPU 206 interactions. The north bridge 210 is coupled to Random Access Memory (RAM) 212 and to an I/O controller 220. The I/O controller 220 is coupled to a root of trust agent 224.

The root of trust agent 224 performs various functions. For example, the root of trust agent 224 obtains metrics of platform characteristics that affect the trustworthiness of the platform, store those metrics, and store digests of the metrics in registers 225, 226 (e.g., Platform Configuration Registers (PCRs)). A digest may be described as a snapshot of the platform state. The root of trust agent 224 may be described as a component that is trusted because errant behavior may not be detected in that component. The root of trust agent 224 is used to encrypt and decrypt content. In certain embodiments, the root of trust agent is a Trusted Platform Module (TPM).

The I/O controller is coupled to a data store 222. In certain embodiments, data store 222 comprises a disk volume. Data store 222 is capable of storing encrypted content, an operating system loader, and other data. The I/O controller 220 may also be referred to as a "south bridge". The I/O controller 220 is coupled to an OOB management controller 228 via, for example, a PCI Express bus. The I/O controller 220 is coupled to serial flash memory 240 via, for example, a bus. The OOB management microcontroller 230 is coupled to cache 232 and to RAM 234 and Read Only Memory (ROM) 236. The serial flash memory 240 may be eight megabits (8 Mbits) in certain embodiments. The serial flash memory 240 includes a Basic Input/Output System (BIOS) 241 and a management bank 244. The BIOS 241 may be described as containing BIOS components and firmware 242. The firmware includes instructions that determine what a computing device may do without accessing programs from storage. The BIOS 241 also includes a boot block 243, which may also be referred to as a "Core Root of Trust for Management" and which initiates a booting and measurement process. The boot block 243 is implicitly trusted since the boot block 243 takes control when the platform powers on. The management bank 244 includes an Out-Of-Band (OOB) management agent 246 and a private store 248. The OOB management agent 246 is coupled to the root of trust agent 224.

The OOB management controller 228 is coupled to a network port 250, which is coupled to a network 260. The network 260 is, in turn, coupled to a remote agent 270, which includes a data store 272, which is capable of storing decrypted content.

Embodiments provide an embedded OOB management agent 246 that intercedes in the root of trust agent 224 seal and unseal operations so that encrypted content from an operating system may be backed-up in the clear by the embedded OOB management agent. The seal and unseal operations may be described as encrypting or decrypting content, respectively, based upon the OOB management agent 246 that requested the seal or unseal and the platform state found using a digest stored in registers 225.

Figure 3:
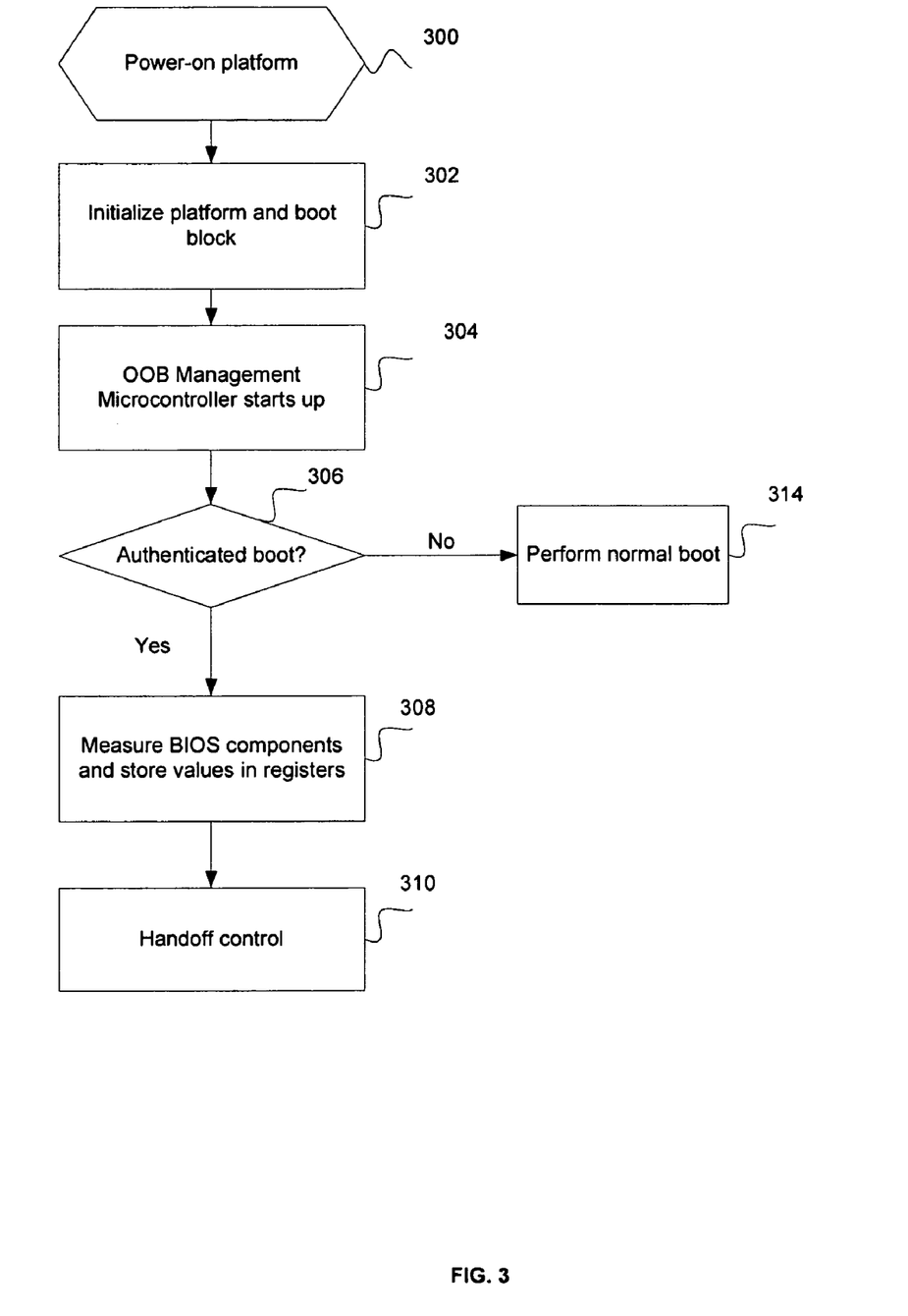
FIG. 3 illustrates logic performed by BIOS in accordance with certain embodiments.

FIG. 3 illustrates logic performed by BIOS 241 in accordance with certain embodiments. Control begins at block 300 with the platform 200 being powered on (e.g., when the computing device, of which the platform 200 is a part, is started). In block 302, the BIOS 241 initializes the platform 200 and the boot block 243. In block 304, the OOB management microcontroller 230 starts up in response to the power-on. In block 306, the boot block 243 determines whether this is an authenticated boot (e.g., by checking an indicator (e.g., a bit) set by the operating system). The term boot may be described as loading software that starts a computing device, which, in certain embodiments, is an operating system. If so, processing continues to block 308, otherwise, processing continues to block 314. In block 314, a normal boot is performed.

In block 308, the boot block 243 measures the BIOS components and firmware 242 to generate certain values (which may also be referred to as platform metrics) and stores these values in registers 225, 226 (e.g. Platform Configuration Registers (PCRs)). In particular, the measuring is performed to provide integrity protected booting. In certain embodiments, the measuring includes generating a hash-based measurement (also referred to as a "digest" or "fingerprint") of all executable code in the boot chain and securely storing the hash-based measurement in registers 225. Thus, in these embodiments, the boot block 243 takes a hash of the BIOS components and firmware 242 to generate a hash value and stores the hash value in registers 225. In certain embodiments, registers 225 may not be deleted or arbitrarily overwritten within a boot cycle, but registers may be updated using a chained hash technique (i.e., Updated PCR Value=Hash(Previous PCR Value||Current Measurement To Store), where the symbol || represents concatenation). The chained hash technique enables a large number of measurements to be stored or committed in a fixed size register. If any executable stage in the chain generated by the chained has technique has been modified, the change is reflected in the hash value. Thus, in certain embodiments, registers 225 store digests, and registers 226 store other root of trust agent values, such as BIOS measurements.

In block 310, the BIOS 241 hands off control (i.e., transfers control to another component). In certain embodiments, control is handed off to an operating system loader.

Figure 4:
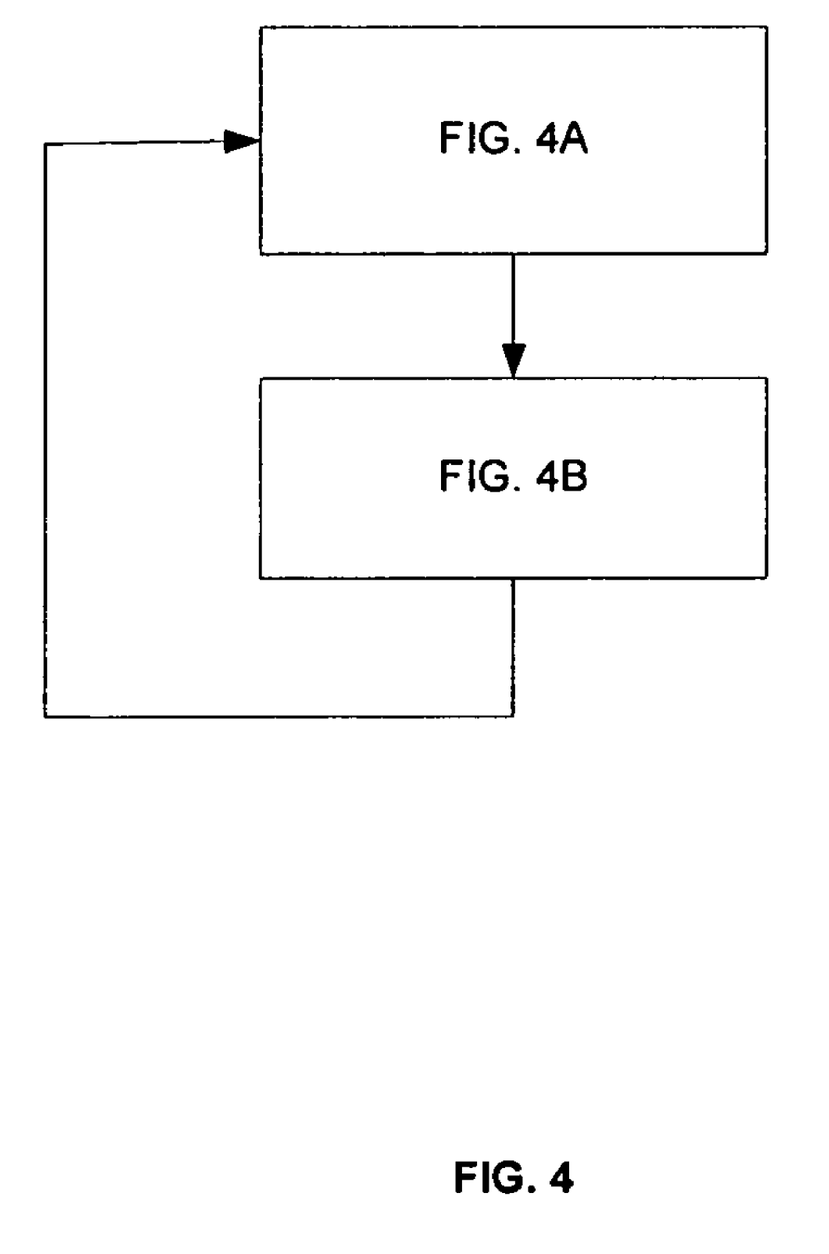
FIG. 4 illustrates logic for encrypting and decrypting content in accordance with certain embodiments.
Figure 4A:
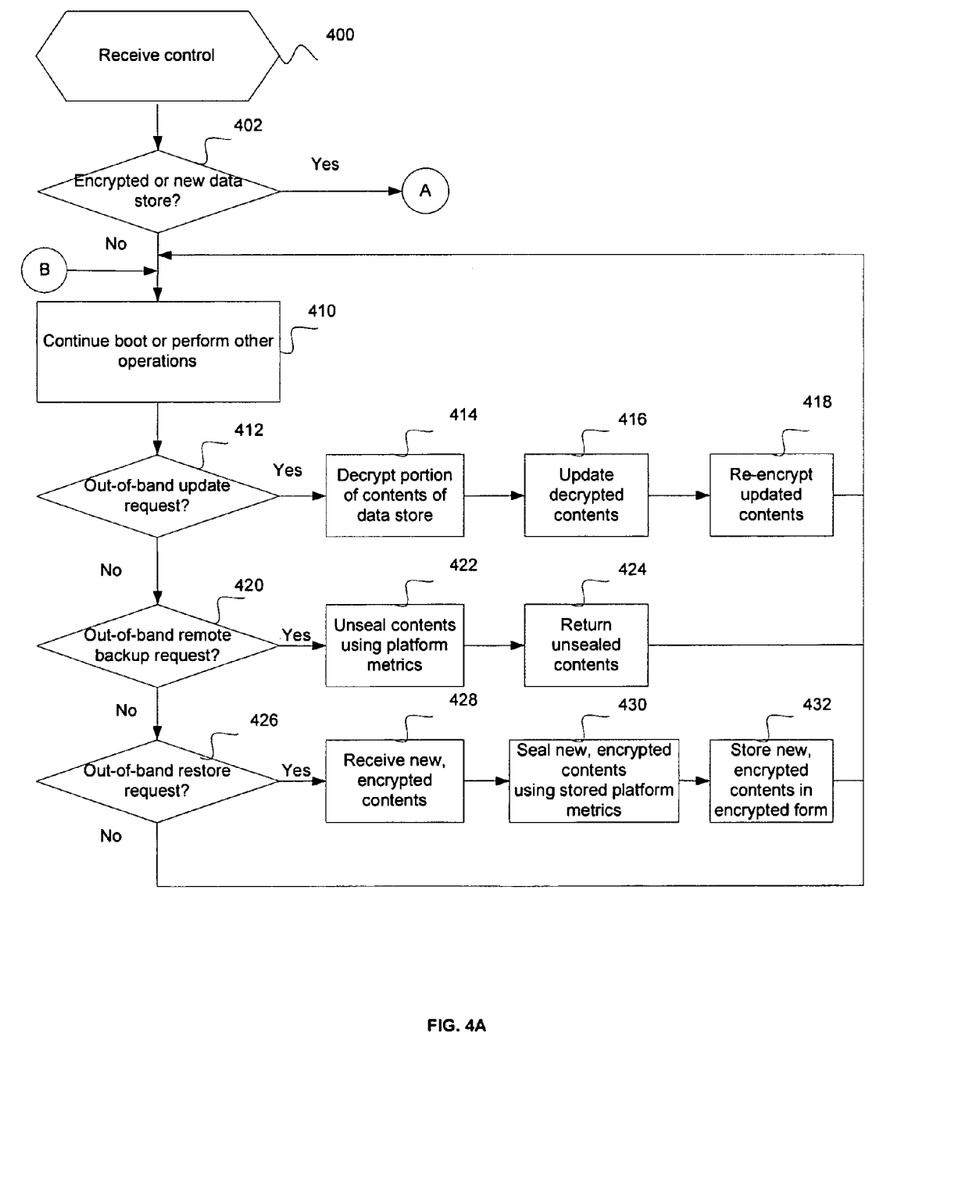
FIG. 4A and FIG. 4B are used to illustrate FIG. 4.
Figure 4B:
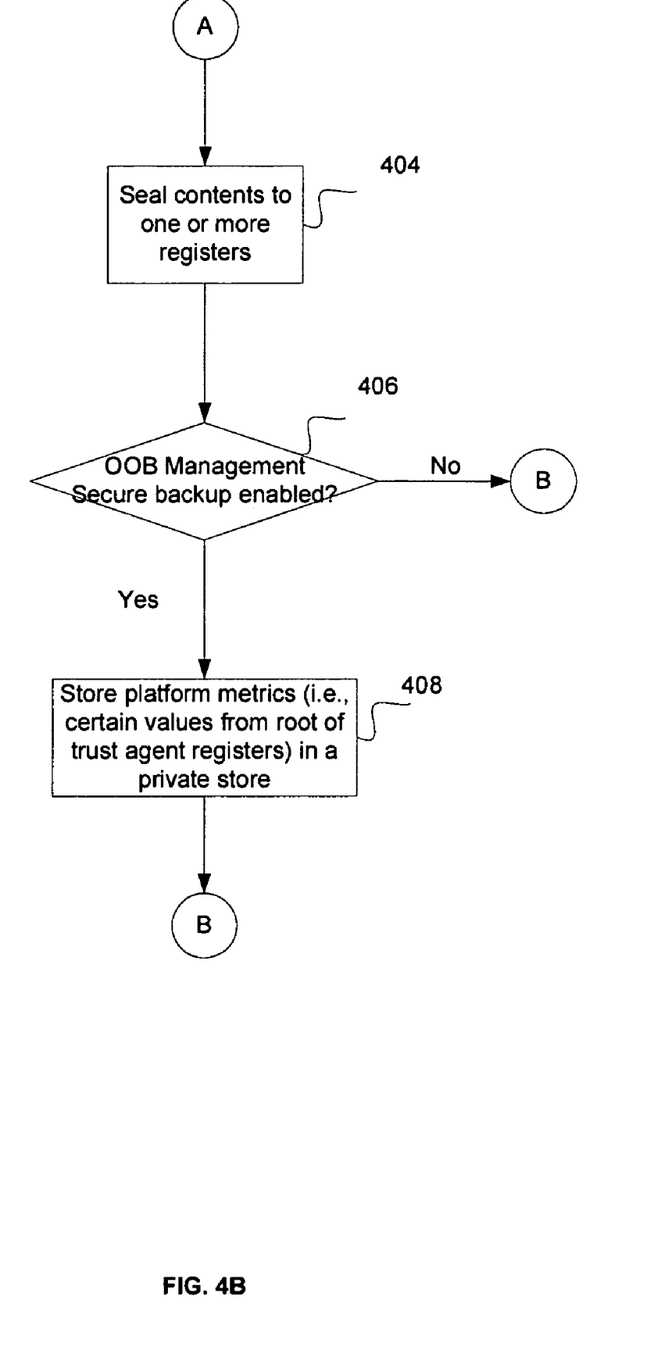

FIG. 4 illustrates logic for encrypting and decrypting content in accordance with certain embodiments. FIG. 4A and FIG. 4B are used to illustrate FIG. 4. Control may move from FIG. 4A to FIG. 4B and back from FIG. 4B to FIG. 4A.

Control begins in FIG. 4A at block 400 with the operating system loader receiving control. Although FIG. 4 is described with reference to an operating system loader, in alternative embodiments, the logic of FIG. 4 may be performed by another component. In block 402, the operating system loader determines whether a data store is encrypted or new. If the data store is encrypted or new, processing continues to block 404 (FIG. 4B.), otherwise, processing continues to block 410.

In FIG. 4B, at block 404, the OOB management agent 246, which is called by the operating system or some other component having received control seals the contents of data store 222 to one or more registers 225. In certain embodiments, the OOB management agent 246 invokes the root of trust agent 224 to perform a seal operation to seal the contents of a disk image to the registers 225. In certain embodiments, the OOB management agent 246 provides the root of trust agent 224 with encrypted content, and the encrypted content includes a first key (e.g., a symmetric key) used to encrypt the content. The root of trust agent 224 generates a sealed message by selecting a range of register values from registers 225 and uses a second key (e.g., an asymmetric key belonging to the root of trust agent 224) to asymmetrically encrypt both the register values and the encrypted content. The range that is selected may be platform specific and content specific. The seal operation then associates the sealed message with a set of platform metrics (i.e., metrics that indicate platform configuration) specified by the OOB management agent 246.

When the root of trust agent 224 receives a request to unseal the contents of the data store 222, the root of trust agent 224 uses the second key to decrypt the encrypted content (which is still encrypted with the first key) when the platform configuration state matches the set of platform metrics associated with the sealed message.

In block 406, the OOB management agent 246 determines whether OOB management secure backup is enabled. In certain embodiments, this determination is made by checking an indicator (e.g., a flag) set by BIOS 241. If so, processing continues to block 408, otherwise, processing continues to block 410 of FIG. 4A. In block 408, the OOB management agent 246 stores platform metrics (i.e., certain values from root of trust agent registers 225, 226 generated in block 308) in a private store 248. In certain embodiments, registers 225 store digests, and registers 226 store other root of trust agent values, such as BIOS measurements. From block 408, processing continues to block 410.

In block 410, the operating system loader continues the boot or, if the boot is completed, performs other operations. Once the boot is complete, the operating system loader hands off control to the operating system or another component. In block 412, it is determined whether an out-of-band update request has been received. An out-of-band update request may be described as a request to update data that has been received from a remote agent 270. If an out-of-band update request has been received, processing continues to block 414, otherwise, processing continues to block 420. In block 414, the OOB management firmware 246 decrypts a portion of the contents of the data store 222 using a key from the private store 248. In block 416, the OOB management firmware 246 updates the decrypted contents. In block 418, the OOB management firmware 246 re-encrypts the updated contents so that the re-encrypted contents are stored in the data store 222. From block 418, processing continues to block 410.

In block 420, it is determined whether an out-of-band remote backup request has been received. An out-of-band remote backup request may be described as a request to backup data that has been received from a remote agent 270, and the remote agent 270 desires to receive a copy of the data for storing a backup copy. If an out-of-band remote backup request has been received for the contents, processing continues to block 422, otherwise, processing continues to block 426. In certain embodiments, the out-of-band remote backup request is for all contents, rather than a portion of the contents. In block 422, the OOB management firmware 246 unseals the contents using platform metrics. The term unseal may be described as using the root of trust agent 224 to decrypt the encrypted content with the second key (in which case the encrypted content is still encrypted with the first key) if the platform configuration state matches the set of platform metrics associated with the sealed message. If the platform configuration state does not match the set of platform metrics associated with the sealed message, then the content may not be unsealed. In block 424, the OOB management agent 246 returns the unsealed contents in response to the remote backup request. In certain embodiments, the unsealed contents are returned over a Transport Layer Services (TLS) channel (IETF RFC 2246, published January 1999). A TLS channel may be described as a secure channel that allows applications to communicate in a way that is designed to prevent eavesdropping, tampering, or message forgery. Use of a TLS channel prevents contents from being revealed in the clear. From block 424, processing continues to block 410.

In block 426, it is determined whether an out-of-band restore request has been received. An out-of-band restore request may be described as a request to replace data in data store 222 that has been received from a remote agent 270. If an out-of-band restore request has been received, processing continues to block 428, otherwise, processing continues to block 410. In block 428, the OOB management agent 246 receives new, encrypted content from the remote agent 270. In this case, the remote agent 270 desires to restore certain content in data store 222. In block 430, the OOB management agent 246 seals the new, encrypted content using the platform metrics stored in private store 248. In block 432, the OOB management agent 246 stores the new, encrypted contents in encrypted form in data store 222.

Figure 5:
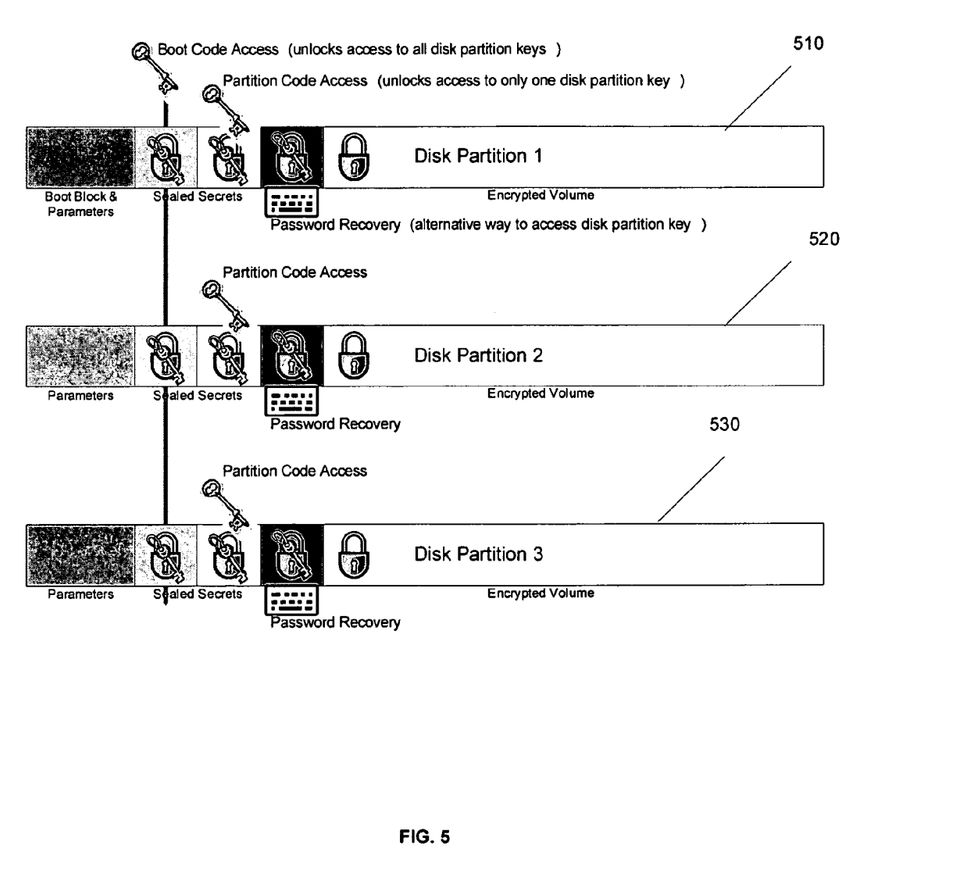
FIG. 5 illustrates partitions of a disk volume in accordance with certain embodiments.

FIG. 5 illustrates partitions of a disk volume 222 (i.e., a type of data store) in accordance with certain embodiments. The disk volume 222 may be divided into multiple partitions, such as partition 1 510, partition 2 520, and partition 3 530. Each partition 510, 520, 530 includes a boot block and parameters portion, a sealed secrets portion, a password recovery portion, and an encrypted disk volume portion. The boot block and parameters portion is not encrypted. The sealed secrets portion may include a boot code access that unlocks access to all of the disk partition keys and a partition code access that unlocks access to one disk partition key. The password recovery portion includes an alternative way to access the disk partition key. The encrypted disk volume portion stores encrypted data. Each partition 510, 520, 530 may use different sealed secrets and encryption formats to secure data.

Embodiments provide backup and restoration of an encrypted data store in a seamless fashion. Embodiments allow for an OOB management agent 246 to maintain the ability to perform a disk backup and maintain appropriate confidentiality requirements.

In particular, certain embodiments track specific values used to encrypt a data store, including, but not limited to, an authorization value (i.e., a key used to protect other keys) and the contents of the platform configuration registers (PCRs). While an in-band, operating system agent is unsealing/sealing a key (e.g., a system key ("SYSKEY")) to encrypt the data store, the OOB agent provides the corresponding decryption of the disk contents upon a remote request for a backup. For example, the OOB management agent may use the root of trust agent to decrypt the data store based upon the key (e.g., SYSKEY) and uses the key to unseal the data.

With embodiments, platforms are more manageable and secure. In particular, in-band security and out-of-band content backup, update, and restoration co-exist. For example, with embodiments, an Operating System Vendor (OSV) has in-band security, such as that afforded by the root of trust agent, whereas an Information Technology (IT) department is provided with secure out-of-band operations.

The described operations may be implemented as a method, apparatus or article of manufacture using standard programming and/or engineering techniques to produce software, firmware, hardware, or any combination thereof. The term "article of manufacture" as used herein refers to code or logic implemented in a medium, where such medium may comprise hardware logic (e.g., an integrated circuit chip, Programmable Gate Array (PGA), Application Specific Integrated Circuit (ASIC), etc.) or a computer readable medium, such as magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor. The medium in which the code or logic is encoded may also comprise transmission signals propagating through space or a transmission media, such as an optical fiber, copper wire, etc. The transmission signal in which the code or logic is encoded may further comprise a wireless signal, satellite transmission, radio waves, infrared signals, Bluetooth, etc. The transmission signal in which the code or logic is encoded is capable of being transmitted by a transmitting station and received by a receiving station, where the code or logic encoded in the transmission signal may be decoded and stored in hardware or a computer readable medium at the receiving and transmitting stations or devices. Additionally, the "article of manufacture" may comprise a combination of hardware and software components in which the code is embodied, processed, and executed. Of course, those skilled in the art will recognize that many modifications may be made to this configuration without departing from the scope of embodiments of the invention, and that the article of manufacture may comprise any information bearing medium known in the art.

The term logic may include, by way of example, software or hardware and/or combinations of software and hardware.

The illustrated operations of FIGS. 3 and 4 show certain events occurring in a certain order. In alternative embodiments, certain operations may be performed in a different order, modified or removed. Moreover, operations may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments has been presented for the purposes of illustration and description. It is not intended to be exhaustive or limiting. Many modifications and variations are possible in light of the above teachings.

What is claimed is:

1. A method capable of migrating data, comprising:
   sealing, using a computer including a processor, contents of a data store to one or more registers, wherein the contents are encrypted;
   in response to determining that secure backup is enabled, storing the platform metrics from the one more registers in a private store;
   receiving an out-of-band request for the contents of the data store; and
   responding to the out-of-band request by:
      in response to the out-of-band request being an out-of-band restore request to replace the contents of the data store with new, encrypted contents that have been received from a remote agent,
      sealing the new, encrypted contents using the stored platform metrics; and
      storing the new, encrypted contents.

2. The method of claim 1, wherein sealing the contents further comprises:
   generating a sealed message by selecting a range of register values and using a key to asymmetrically encrypt both the register values and the contents; and
   associating the sealed message with the platform metrics.

3. The method of claim 1, wherein the out-of-band request is an out-of-band update request to update the contents of the data store with new contents that have been received from the remote agent and further comprising:
   decrypting a portion of the contents;
   updating the decrypted contents; and
   re-encrypting the updated contents.

4. The method of claim 1, wherein the out-of-band request is an out-of-band remote backup request from the remote agent for a copy of the contents for storing a backup copy and further comprising:
determining whether a platform configuration state matches the platform metrics associated with the sealed contents;
in response determining that the platform configuration state matches the platform metrics associated with the sealed contents, unsealing the contents using the stored platform metrics; and
returning the unsealed contents in response to the out-of-band remote backup request.

5. The method of claim 1, further comprising:
determining whether this is an authenticated boot; and
in response to determining that this is an authenticated boot,
measuring BIOS components and firmware to generate a hash value; and
storing the hash value in at least one of the one or more registers.

6. A system for migrating data, comprising:
a data store storing contents;
one or more registers;
a private store;
a motherboard; and
an out-of-band management agent;
wherein the out of band management agent is operable to:
seal the contents of the data store to the one or more registers, wherein the contents are encrypted;
in response to determining that secure backup is enabled, store the platform metrics from the one more registers in the private store;
receive an out-of-band request for the contents of the data store; and
respond to the out-of-band request by:
in response to the out-of-band request being an out-of-band restore request to replace the contents of the data store with new, encrypted contents that have been received from a remote agent,
sealing the new, encrypted contents using the stored platform metrics; and
storing the new, encrypted contents.

7. The system of claim 6, wherein to seal the contents, the out of band management agent is operable to:
generate a sealed message by selecting a range of register values and using a key to asymmetrically encrypt both the register values and the contents; and
associate the sealed message with the platform metrics.

8. The system of claim 6, wherein the out-of-band request is an out-of-band update request to update the contents of the data store with new contents that have been received from the remote agent and wherein the out of band management agent is operable to:
decrypt a portion of the contents;
update the decrypted contents; and
re-encrypt the updated contents.

9. The system of claim 6, wherein the out-of-band request is an out-of-band remote backup request from the remote agent for a copy of the contents for storing a backup copy and wherein the out of band management agent is operable to:
determine whether a platform configuration state matches the platform metrics associated with the sealed contents;
in response determining that the platform configuration state matches the platform metrics associated with the sealed contents, unseal the contents using the stored platform metrics; and
return the unsealed contents in response to the out-of-band remote backup request.

10. The system of claim 6, wherein the out of band management agent is operable to:
determine whether this is an authenticated boot; and
in response to determining that this is an authenticated boot,
measure BIOS components and firmware to generate a hash value; and
store the hash value in at least one of the one or more registers.

11. An article of manufacture for migrating data, wherein the article of manufacture comprises a computer readable medium storing instructions, and wherein the article of manufacture is operable to:
seal contents of a data store to one or more registers wherein the contents are encrypted;
in response to determining that secure backup is enabled, store the platform metrics from the one more registers in a private store;
receive an out-of-band request for the contents of the data store;
respond to the out-of-band request by:
in response to the out-of-band request being an out-of-band restore request to replace the contents of the data store with new, encrypted contents that have been received from a remote agent,
sealing the new, encrypted contents using the stored platform metrics; and
storing the new, encrypted contents.

12. The article of manufacture of claim 11, wherein to seal the contents, wherein the article of manufacture is operable to:
generate a sealed message by selecting a range of register values and using a key to asymmetrically encrypt both the register values and the contents; and
associate the sealed message with the platform metrics.

13. The article of manufacture of claim 11, wherein the out-of-band request is an out-of-band update request to update the contents of the data store with new contents that have been received from the remote agent and wherein the article of manufacture is operable to:
decrypt a portion of the contents;
update the decrypted contents; and
re-encrypt the updated contents.

14. The article of manufacture of claim 11, wherein the out-of-band request is an out-of-band remote backup request from the remote agent for a copy of the contents for storing a backup copy and wherein the article of manufacture is operable to:
determine whether a platform configuration state matches the platform metrics associated with the sealed contents;
in response determining that the platform configuration state matches the platform metrics associated with the sealed contents, unseal the contents using the stored platform metrics; and
return the unsealed contents in response to the out-of-band remote backup request.

15. The article of manufacture of claim 11, wherein the article of manufacture is operable to:
determine whether this is an authenticated boot; and
in response to determining that this is an authenticated boot,
measure BIOS components and firmware to generate a hash value; and
store the hash value in at least one of the one or more registers.

16. A system for migrating data, comprising:
a data store storing contents;
a root of trust agent including one or more registers;
an out-of-band management agent coupled to the root of trust agent; and
a private store coupled to the out-of-band management agent;
wherein the out of band management agent is operable to:
   seal the contents of the data store to the one or more registers, wherein the contents are encrypted by the root of trust agent;
   in response to determining that secure backup is enabled, store the platform metrics from the one more registers in the private store;
   receive an out-of-band request for the contents of the data store;
   respond to the out-of-band request by:
      in response to the out-of-band request being an out-of-band restore request to replace the contents of the data store with new, encrypted contents that have been received from a remote agent,
      sealing the new, encrypted contents using the stored platform metrics; and
      storing the new, encrypted contents.

* * * * *